(12) United States Patent
Mathews et al.

(10) Patent No.: US 12,084,184 B2
(45) Date of Patent: Sep. 10, 2024

(54) AEROSPACE VEHICLES HAVING MULTIPLE LIFTING SURFACES

(71) Applicant: SE AERONAUTICS INC, Springville, AL (US)

(72) Inventors: William Tyler Mathews, Springville, AL (US); Harold Irven Mathews, Jr., Springville, AL (US)

(*) Notice: Subject to any disclaimer, the term of this patent is extended or adjusted under 35 U.S.C. 154(b) by 22 days.

(21) Appl. No.: 18/050,850

(22) Filed: Oct. 28, 2022

(65) Prior Publication Data

US 2023/0143095 A1   May 11, 2023

Related U.S. Application Data

(60) Provisional application No. 63/263,879, filed on Nov. 10, 2021.

(51) Int. Cl.
| | |
|---|---|
| *B64C 39/08* | (2006.01) |
| *B64C 1/00* | (2006.01) |
| *B64C 1/26* | (2006.01) |
| *B64C 9/24* | (2006.01) |
| *B64C 23/06* | (2006.01) |
| *B64D 27/20* | (2006.01) |
| *B64F 5/10* | (2017.01) |

(52) U.S. Cl.
CPC ............... *B64C 39/08* (2013.01); *B64C 1/26* (2013.01); *B64C 9/24* (2013.01); *B64C 23/069* (2017.05); *B64D 27/20* (2013.01); *B64F 5/10* (2017.01); *B64C 2001/0072* (2013.01)

(58) Field of Classification Search
CPC ..................... B64C 39/08; B64C 2001/0072
See application file for complete search history.

(56) References Cited

U.S. PATENT DOCUMENTS

| | | | |
|---|---|---|---|
| 3,298,633 A | 1/1967 | Dastoli | |
| 8,616,492 B2* | 12/2013 | Oliver | B64C 29/0075 244/12.4 |
| 8,708,273 B2 | 4/2014 | Oliver | |
| 8,800,912 B2 | 8/2014 | Oliver | |
| 10,144,503 B1* | 12/2018 | Vander Lind | B64C 29/0025 |
| 2010/0193644 A1* | 8/2010 | Karem | B64C 29/0033 244/7 R |
| 2016/0009415 A1 | 1/2016 | Uitenbogerd | |
| 2016/0083075 A1* | 3/2016 | Moxon | B64C 3/52 244/13 |

\* cited by examiner

*Primary Examiner* — Timothy D Collins
*Assistant Examiner* — Eric Acosta

(57) ABSTRACT

Various aerospace vehicle systems and methods are disclosed. In one embodiment, a fuel efficient, low emissions aerospace vehicle includes a fuselage having a fineness ratio of equal to or greater than 8. The fuselage is comprised of at least 50% composite materials. The aerospace vehicle also includes a first wing, a second wing, and a third wing coupled to the fuselage, each wing having an aspect ratio of equal to or greater than 35. The wings each have a span within 10% of one another and an aspect ratio within 10% of one another. Each wing is comprised of at least 50% composite materials. The aerospace vehicle also includes at least one stabilizing unit coupled to the fuselage. The stabilizing unit includes first and second stabilizer surfaces configured in a V-tail configuration. The aerospace vehicle further includes at least one propulsion system.

5 Claims, 3 Drawing Sheets

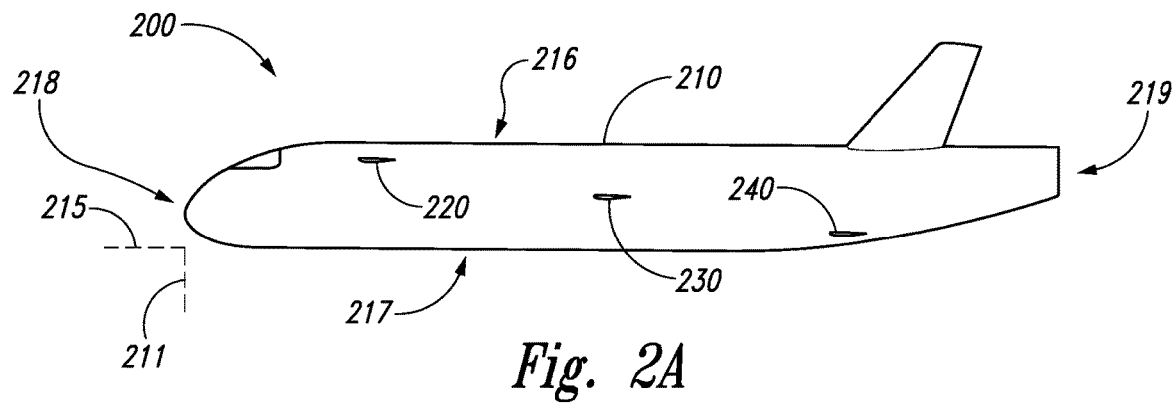
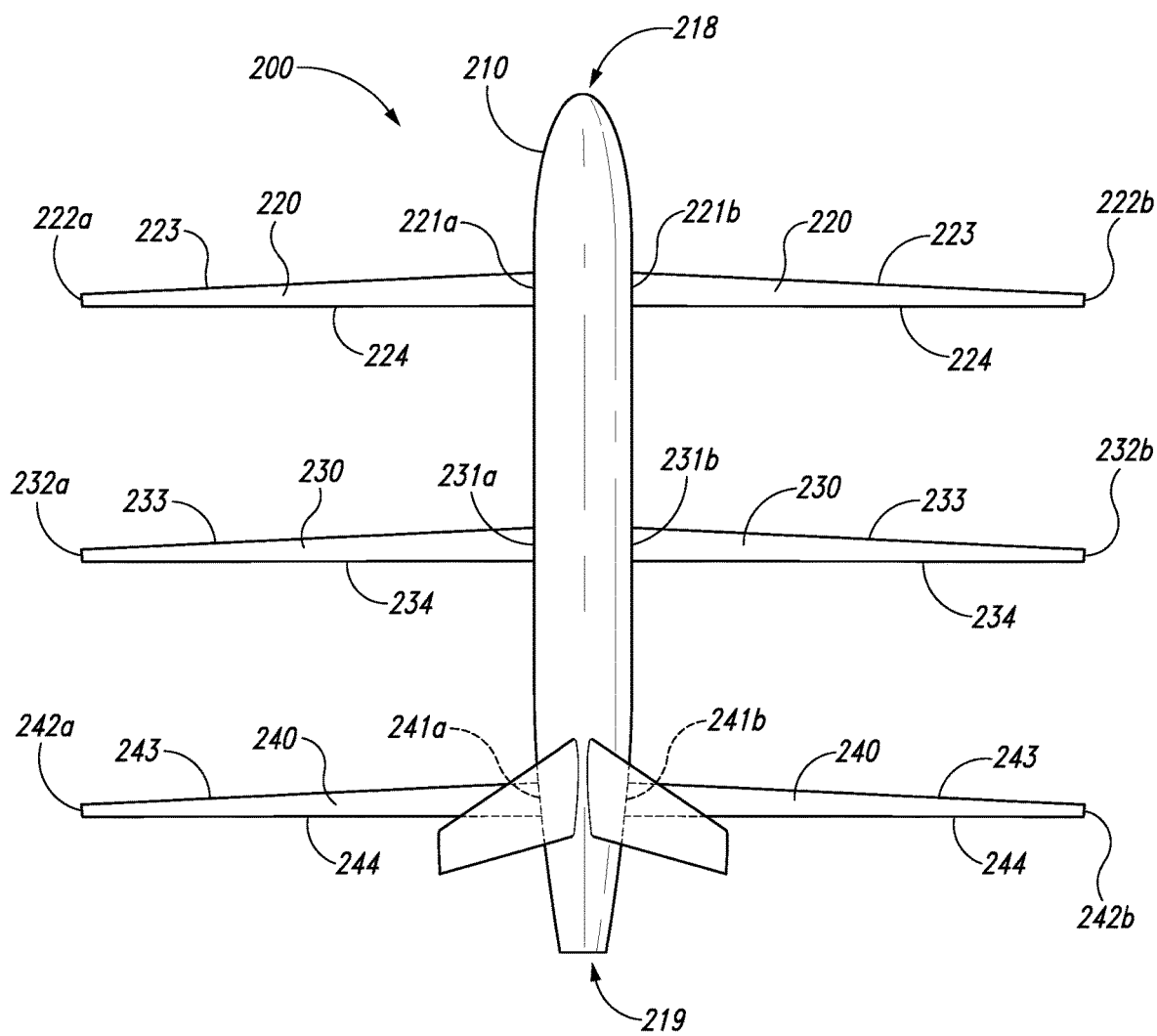

AEROSPACE VEHICLES HAVING MULTIPLE LIFTING SURFACES

CROSS REFERENCE TO RELATED APPLICATION

This application claims the benefit of U.S. Provisional Patent Application No. 63/263,879, filed Nov. 10, 2021, which is incorporated by reference herein in its entirety.

TECHNICAL FIELD

Embodiments of the present disclosure relate to aerospace vehicles having multiple lifting surfaces and associated methods.

BACKGROUND

The growth in air transportation has doubled every 15 years, which would bring air traffic to 16 billion passengers and 400 million tons of cargo for the year 2050. However, increased environmental concerns and rising fuel prices have posed obstacles for the industry alongside renewed calls for increased safety, efficiency, and reliability. Moreover, the production process for current airliners is costly and time consuming, requiring builders to bolt together large sections of the craft, also referred to as barrels, which can be time intensive to complete and can further introduce mechanical weak points in the frame.

With the rising price of aviation fuels and concerns over the impact of aviation on the environment, aircraft fuel economy and efficiency are becoming increasingly important. For example, airlines often work on tight operating budgets and fuel savings can significantly impact an airline's bottom line. Furthermore, industry and government agencies are starting to impose emission standards or goals on the aviation industry, increasing the focus on decreasing carbon footprints.

Accordingly, aircraft designers are constantly looking at ways to improve fuel economy, reduce carbon emissions, or both. For example, engine manufacturers are constantly looking for ways to improve fuel burn on engines that use carbon-based fuels. Of course, as fuel economy improves, carbon emissions per trip are also reduced and the environmental impact can be improved.

The use of hydrogen burning engines are also being considered. However, the manufacturing process required to produce hydrogen-based aerospace fuels raises significant environmental concerns. Likewise, experts have raised concerns that hydrogen can pose a hazard to the ozone layer which can exacerbate current climate effects. Additionally, along with the environmental issues, the cost, and storage requirements (including limited volume for onboard storage), fuel economy remains an important design consideration when using hydrogen burning engines.

Electric propulsion systems are another option. However, the environment can be impacted by electric power production depending on the generation method used. Additionally, onboard hydrogen-fuel-cell electrical power generation can be heavy and complex, and onboard batteries are heavy and range limiting. Accordingly, aerodynamic efficiency is critical to get usable range.

Aircraft efficiency and performance can be important design considerations for other reasons. For example, as real estate for and around airports become more limited, aircraft are often required to operate from shorter runways or climb out steeply for noise abatement. In other cases, missions require aircraft designed to loiter for extended periods, operate at high altitudes, or both. Aircraft efficiency and performance can become critical design considerations for these types of operations.

Fuel economy, efficiency, performance have always been prime design considerations, but have become increasingly important because of rising fuel costs, limitations associated with newer propulsion technologies, and increased emphasis on aviation's impact on the environment.

Description of Certain Related Art

Most modern commercial aircraft are conventionally configured with a single wing and conventional tail. These aircraft generally have the single wing located on the fuselage such that the aircraft's center of gravity is forward of the aerodynamic center of lift for stability considerations. This configuration generally requires the tail to produce a down force for stabilized cruise flight, thereby increasing lift requirements on the single or main wing and accordingly increasing drag on the aircraft. A small number of fighter jets, light private, and light commercial aircraft are configured with canards, for performance or control reasons. Some of the aircraft having canards also include a conventional tail. However, even while designers strive to improve fuel economy, efficiency, and performance, designers generally do not find canard configurations suitable of large transport aircraft and most new commercial aircraft designs continue to use conventional configurations. It will further be appreciated that the design features of one aircraft cannot simply be transferred into another design.

SUMMARY

The following summary is provided for the benefit of the reader only and is not intended to limit in any way the disclosure as set forth by the claims. The present disclosure relates to aerospace vehicles. One aspect of the disclosure is directed toward a fuel efficient, low emissions aerospace vehicle that can includes a fuselage comprised of at least 50% composite materials and with a fineness ratio of equal to or greater than 8. The vehicle also includes a first wing, a second wing, and a third wing coupled to the fuselage. Each wing is comprised of at least 50% composite materials and has an aspect ratio of equal to or greater than 35. The wings all have a span within 10% of one another and an aspect ratio within 10% of one another. The vehicle further includes at least one stabilizing unit or stabilizer unit coupled to the fuselage. The stabilizing unit includes a first stabilizer surface and a second stabilizer surfaces. The first and second stabilizer surfaces are configured in a V-tail configuration. The vehicle also includes at least one propulsion system that includes a first turbofan engine and a second turbofan engine. The first and second turbofan engines are at least partially mounted within an aft portion of the fuselage in a vertically stacked configuration such that loss of either engine does not cause a thrust asymmetry in the directional axis.

Another aspect of the present disclosure is directed toward a method for manufacturing a fuel efficient, low emissions aerospace vehicle that can include coupling a first wing, a second wing, and a third wing, to a fuselage. Each wing has an aspect ratio of equal to or greater than 35. The wings each have a span within 10% of one another and an aspect ratio within 10% of one another. Each wing is comprised of at least 50% composite materials. The fuselage has a fineness ratio of equal to or greater than 8 and is comprised of at least 50% composite materials. The method further includes coupling at least one stabilizing unit to the fuselage. The stabilizing unit includes a first stabilizer surface and a second stabilizer surfaces. The first and second stabilizer surfaces are configured in a V-tail configuration. The method still further includes coupling at least one propulsion system to the fuselage. The propulsion system includes a first turbofan engine and a second turbofan engine. The first and second turbofan engines are at least partially mounted within an aft portion of the fuselage in a vertically stacked configuration such that loss of either engine does not cause a thrust asymmetry in the directional axis.

BRIEF DESCRIPTION OF DRAWINGS

Various embodiments are depicted in the accompanying drawings for illustrative purposes and should in no way be interpreted as limiting the scope of the embodiments. Various features of different disclosed embodiments can be combined to form additional embodiments, which are part of this disclosure.

FIG. 2A is a partially schematic side elevation view of an aerospace vehicle in accordance with other embodiments of the disclosure.

FIG. 2B is a partially schematic planform view of an aerospace vehicle in accordance with the embodiment of the disclosure shown in FIG. 2A.

DETAILED DESCRIPTION INCLUDING BEST MODE

Figure 1A:
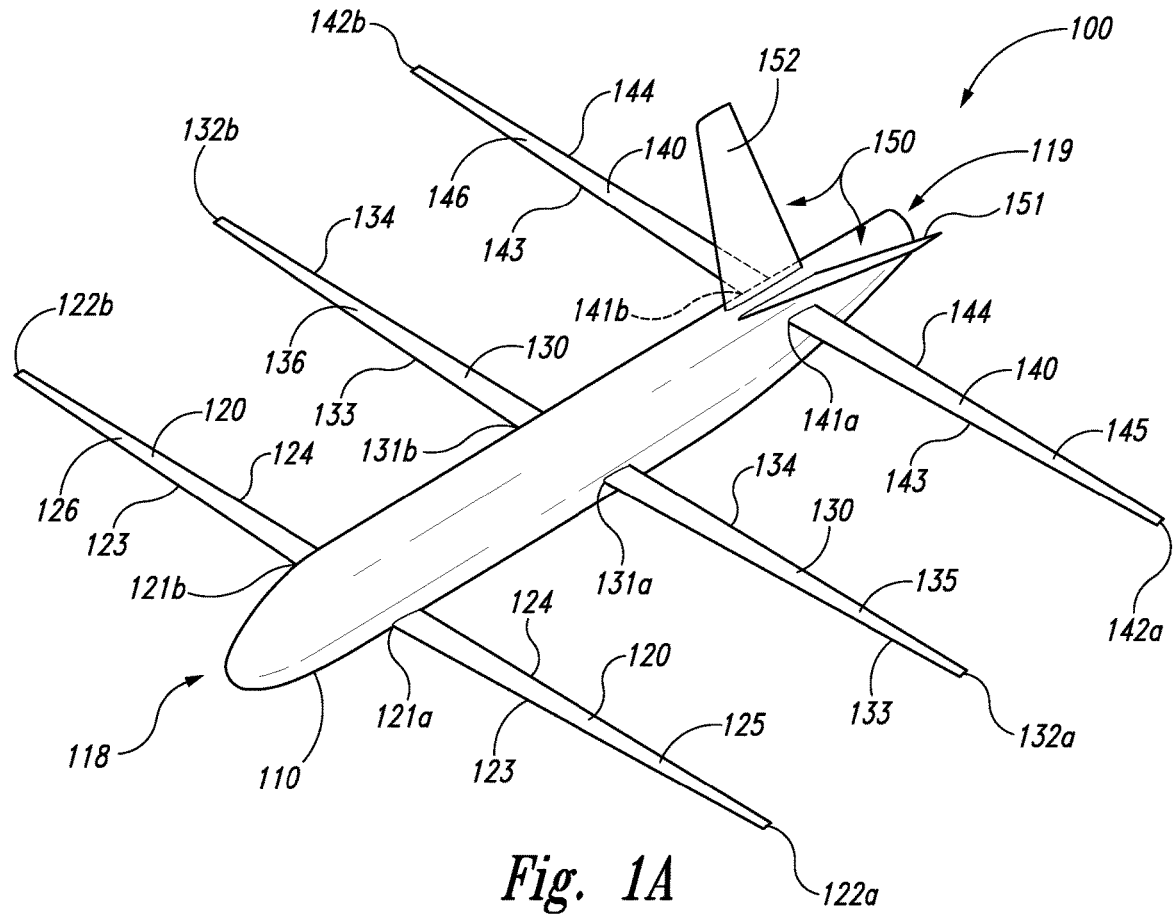
FIG. 1A is a partially schematic isometric projection of an aerospace vehicle in accordance with embodiments of the disclosure.

Various aerospace vehicles and associated methods are described below to illustrate various examples that may achieve one or more desired improvements. These examples are only illustrative and not intended in any way to restrict the general disclosure presented or the various aspects and features described herein. Furthermore, the general principles described herein may be applied to embodiments and applications other than those specifically discussed herein without departing from the spirit and scope of the disclosure. This disclosure is not limited to any particular embodiment shown, but is instead to be accorded the widest scope consistent with the principles and features that are disclosed or suggested.

Although certain aspects, advantages, and features are described herein, it is not necessary that any particular embodiment include or achieve any or all of those aspects, advantages, or features. Some embodiments may not achieve the advantages described herein but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

Overview

Embodiments of aerospace vehicles disclosed herein can have advantages over existing vehicle designs, including improved fuel economy, efficiency, or performance. In some configurations, the embodiments disclosed herein may overcome some or all of the disadvantages discussed above. For example, selected embodiments include an aerospace vehicle manufactured using composite structures and including multiple high aspect ratio wings along with other novel design features to provide mission optimized performance, fuel economy, efficiencies, and low emissions while also reducing the complexity of the manufacturing process and increasing the structural integrity of the aircraft.

As discussed in more detail below, the use of low weight and high strength composite materials in these embodiments, such as carbon fiber, can reduce airframe weight while providing strength and other desirable structural characteristics (e.g., corrosion resistance, durability, etc.). A substantially composite design not only exhibits improved structural integrity when compared to traditional designs, but can reduce manufacturing time by reducing or eliminating the number of barrels that must be bolted together. Likewise, by reducing the number of barrels that must be bolted together, the airframer has introduced fewer structural points of failure resulting in a stronger and more durable frame. These improvements can lead to the design of previously untenable airframes.

For instance, high aspect ratio wings can provide performance advantages over traditional designs such as decreased drag, increased maximum lift to drag ratios, improved takeoff performance, and the like. However, the length of high aspect ratio wings can act as a lever to amplify forces exerted along the wing and introduce structural concerns, and the increased wingspan can result in a higher moment of inertia in the roll axis, which can make the aircraft more difficult to maneuver. Design considerations such as these have led to the adoption of such wings in glider configurations, but prevented widespread adoption of high aspect ratio wings among larger or heavier aircraft.

Nevertheless, the use of multiple high aspect ratio wings or lifting surfaces can also allow the distribution of weight over these surfaces providing the associated efficiencies associated with high aspect ratio wings. These advantages can be compounded by implementing them along with a composite airframe exhibiting improved structural strength and integrity. For example, in selected embodiments an aerospace vehicle with multiple high aspect ratio wings can have the same or less total wing area than a similarly sized single, lower aspect ratio winged vehicle, yet have the same or better performance. In other embodiments, an aerospace vehicle with multiple high aspect ratio wings can have the same or more total wing area than a similarly sized single, lower aspect ratio winged vehicle, yet have lower drag at selected cruise conditions.

Furthermore, distributing lift across multiple lifting surfaces or wings can provide advantages by providing the opportunity to decrease trim drag by reducing or negating the need for a downward trim force at the rear of the aerospace vehicle in cruise flight. Indeed, distributing lift across multiple lifting surfaces or wings can also have structural advantages that allow at least one of lower drag, better performance, greater fuel economy, or improved efficiency.

For example, if an aerospace vehicle's weight is distributed over three wings, the structural requirement for each wing is reduced over the structural requirements of a wing of a similarly sized single winged aircraft that must carry the weight of the entire aircraft. The reduced structural requirements of each of the three wings on the three winged aerospace vehicle can allow the use of less complex, thinner, longer, higher aspect ratio wings that provide better fuel economy, efficiency, or performance.

It will be appreciated that lower drag, lower weight, and improved lift to drag ratios can result in lower fuel requirements for a given design range and corresponding load. Lower fuel requirements or fuel burn can mean lower emissions (e.g., lower $CO_2$ emissions) for the given trip distance, as well as lower reserve fuel requirements. Additionally, lower fuel requirements allow lower takeoff weights for a given load, reducing runway requirements and obstacle clearance requirements. Alternately, lower drag, lower weight, and improved lift to drag may allow an aerospace vehicle to carry a larger load over the same distance as compared to another aerospace vehicle using the same or less fuel—providing more efficiency for the same or less fuel and $CO_2$ emission.

This feature can be particularly advantageous for airline operations, cargo operations, transport operations, bomber operations, business aviation, and the like. For example, early analysis suggests that the aerospace vehicle configured along the lines of selected embodiments disclosed herein, configured to carry 260 passengers at a design cruise speed of 0.72 Mach at 40,000 feet and using two CFM LEAP-1C turbofan engines would decrease fuel burn and $CO_2$ emissions more than 50% over similarly sized commercial aircraft operating today. Correspondingly, lower drag, lower weight, and improved lift to drag can also be particularly advantageous for short takeoff and landing (STOL) operations, high altitude operations, operations requiring extended loiter time, powerless flight operations (e.g., gliders), reconnaissance operations, drone operations, and the like.

It will be appreciated that various embodiments of the aerospace vehicles disclosed herein can be designed for many different types of missions or operations. The specific type of operation or mission will determine which features are combined in selected embodiments to optimize performance for the specified operation(s).

Figure 1B:
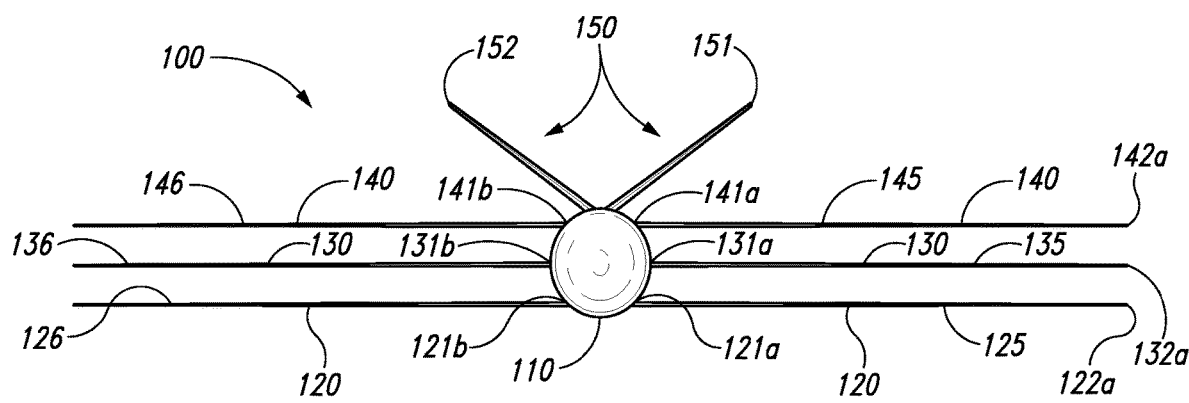
FIG. 1B is a partially schematic front elevation view of an aerospace vehicle in accordance with embodiments of the disclosure shown in FIG. 1A.
Figure 1C:
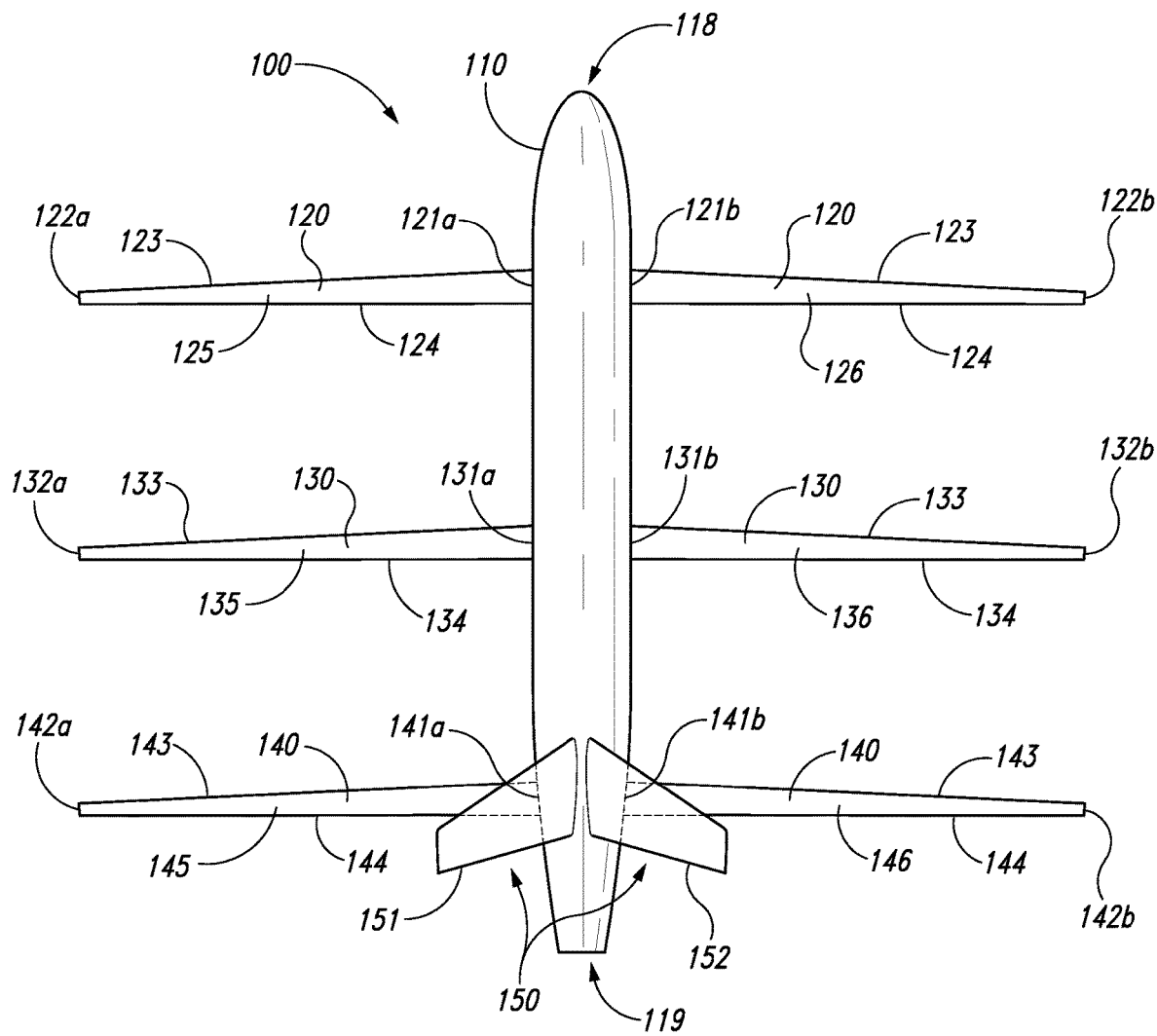
FIG. 1C is a partially schematic planform view of an aerospace vehicle in accordance with embodiments of the disclosure shown in FIG. 1A.
Figure 1D:
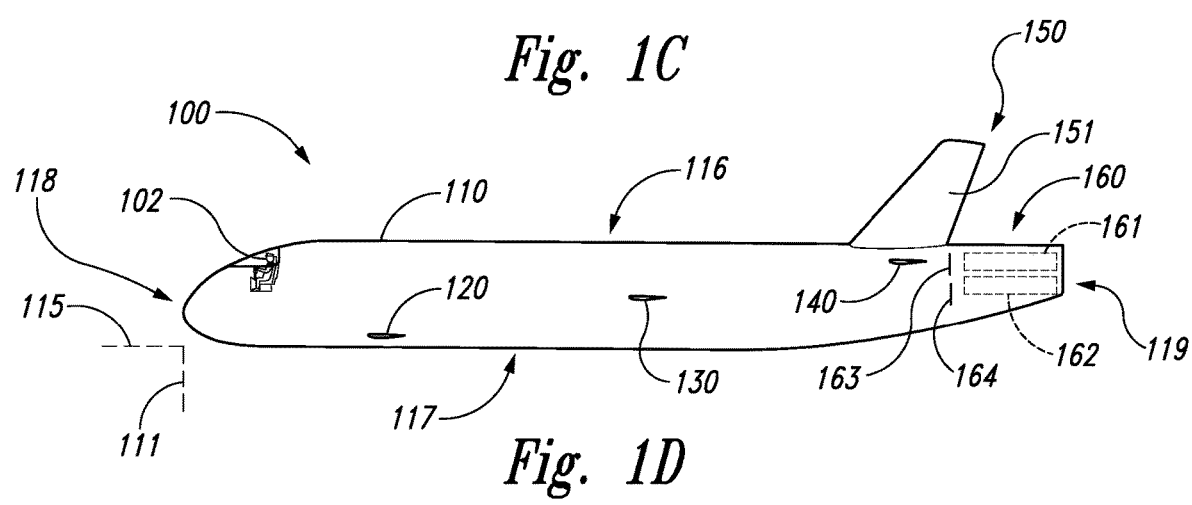
FIG. 1D is a partially schematic side elevation view of an aerospace vehicle in accordance with embodiments of the disclosure shown in FIG. 1A.

FIGS. 1A-1D schematically illustrate an aerospace vehicle 100 in accordance with the selected embodiments of this disclosure. The aerospace vehicle 100 shown in FIGS. 1A-1D is discussed in the context of an airplane configured to operate as a manned airliner in commercial service. But other embodiments can include any type of aerospace vehicle of any size. For example, in other embodiments, the aerospace vehicle 100 can include a vehicle configured as a manned or unmanned aircraft of any size, including transport/cargo aircraft, tanker aircraft, bomber aircraft, reconnaissance aircraft, command and control aircraft, seaplanes, business aircraft, small private aircraft, large drone, small drone, micro drone, or the like.

In FIGS. 1A-1D, the aerospace vehicle 100 includes multiple main lifting surfaces or wings coupled to a fuselage 110. In the present embodiment, the main lifting surfaces or wings include a first wing 120, a second wing 130, and a third wing 140. In FIGS. 1A-1D, the aerospace vehicle 100 also includes a stabilizing unit 150, configured as a V-tail. In the present embodiment, the stabilizing unit 150 includes a first stabilizer surface 151 and a second stabilizer surface 152. The aerospace vehicle 100 in FIGS. 1A-1D also includes a propulsion system 160. In the present embodiment, the propulsion system 160 includes a first engine 161, air fed through a first inlet 163, and a second engine 162, air fed through a second inlet 164.

Fuselage and Lifting Surfaces

As discussed above, the embodiments illustrated in FIGS. 1A-1D are discussed in the context of an airplane configured to operate as a manned airliner in commercial service. Accordingly, for convenience these embodiments are discussed using conventional nomenclature for direction and vehicle axes. For example, as the aircraft is sitting on its landing gear on the ground, direction can be relative to an operator 102 or pilot seated at the controls in the cockpit facing the intended direction of flight. For example, a nose 118 of the aircraft or aerospace vehicle 100 would be at the front of the aircraft, the engines at the rear of the aircraft, and left, right, up, down, top, and bottom would be as perceived by the pilot sitting in the cockpit. Similarly, the longitudinal, directional, and roll axes would be as normally defined and perceived by a pilot sitting in the cockpit.

For convenience in discussing embodiments of the aerospace vehicle 100 in FIGS. 1A-1D it is also useful to define a system for describing the placement of items on the vehicle. Typically, fuselage stations define the location of items longitudinally from an aircraft from a datum point or plane. In the present embodiment, a longitudinal datum plane 111 is the forward most tip of the nose 118 or nose dome of the aerospace vehicle 100 (excluding any extensions beyond the nose dome such as a pitot tube, etc.) and for purposes of defining fuselage stations the stations run longitudinally parallel to the ground as the aircraft sits on its landing gear. Stations are represented in terms of feet from the longitudinal datum plane 111 (which is station zero) with positive values progressing toward a rear 119 of the aerospace vehicle 100 (e.g., toward the engines in FIGS. 1A-1D) and negative values progressing forward of the nose 118.

Similarly, a vertical location of an item can be expressed in feet above or below a waterline datum plane 115. In the present embodiment, the waterline datum plane 115 runs parallel to the ground as the aircraft sits on its landing gear and runs through the lowest point 117 of the fuselage 110 (excluding items extending from the fuselage such as the landing gear, antenna, etc.). Locations can be expressed in terms of feet from the waterline datum plane 115, with positive values progressing upwardly away from the waterline datum plane 115 toward the top 116 of the fuselage 110 and negative values progressing downwardly away from the waterline datum plane 115. Similarly, items can be located left (negative values) and right (positive values) of a buttock line or plain which is represented as a vertical plane running along the longitudinal axis of the aircraft. In the present embodiment, forwardly, rearwardly, upwardly, and downwardly are defined with reference to how the aerospace vehicle 100 sits on its landing gear on the ground and the general direction the aerospace vehicle 100 travels in one g forward flight and as perceived by the operator 102 sitting in the cockpit. One skilled in the art will understand that although the embodiments herein are discussed primarily with reference to a piloted aerospace vehicle, various embodiments are not limited to a piloted vehicle and may be implemented in unmanned aerospace vehicles. Additionally, although the nomenclature and system for describing the location or placement of items on the vehicle discussed above will be used in the discussion below, it is understood that other equivalent nomenclature and systems can be adopted without changing the underlying concepts described below.

In some embodiments, the fuselage 110 is designed to allow sufficient space for the aircraft to store ample cargo and passengers, and also to allow for precise wing placement that will be discussed below. In the present embodiment, the fuselage 110 is approximately 150 feet long having a maximum diameter of approximately 16.5 feet to allow for such mission parameters. More particularly, the fuselage 110 tapers from the nose or front of the fuselage to a diameter of 16.5 feet at approximately 24.4 feet from the forward tip of the nose or the longitudinal datum plane 111, then maintains a tubular shape with an approximate diameter of 16.5 feet to a point approximately 95.2 feet from the forward tip of the nose or the longitudinal datum plane 111, at which point the fuselage begins to taper toward the aft end of the fuselage. The 150-foot fuselage length and maximum diameter of 16.5 feet yields a fineness ratio (fuselage length/maximum fuselage diameter) of approximately 9.1. This fineness ratio strikes a balance between minimizing exposed skin area to improve aerodynamic efficiency while still allowing enough space to provide a workable interior suitable for passenger or cargo transport.

In other embodiments, the fuselage 110 can have other dimensions and shapes. For example, in selected embodiments, the fuselage 110 can be shaped more like a lifting body or can be sized for a much smaller vehicle (e.g., a micro drone) or a much larger vehicle (e.g., an A-380 size aircraft). The fuselage 110 can also have other fuselage fineness ratios depending on design constraints and goals. For example, in some embodiments a fineness ratio can be approximately 5, 5.5, 6, 6.5, 7, 7.5, 8, 8.5, 9, 9.5, 10, 10.5, 11, 11.5, 12, 12.5, 13, 13.5, 14, or 15. In selected embodiments, higher fineness ratios can reduce drag, thereby increasing fuel economy, efficiency, or performance.

Additionally, the fuselage 110 in the present embodiment is constructed or comprised of a composite material, such as a carbon fiber material. In other embodiments the fuselage 110 can be constructed of other materials or partially constructed from other materials, such as other composites, aluminum, other metallic blends, or the like. In selected embodiments, the fuselage 110 can be constructed of approximately 30%, 40%, 50%, 60%, 70%, 80%, 90%, or 100% composite or carbon fiber. In some embodiments, the primary structure of the fuselage 110 is made predominately of a composite such as carbon fiber. For purposes of discussion, the primary structure of the fuselage 110 may include the structural portion of the fuselage 110 but may exclude selected items coupled to the fuselage 110 (e.g., doors, windows, flooring, etc.). In selected embodiments, the primary structure of the fuselage 110 comprises approximately 30%, 40%, 50%, 60%, 70%, 80%, 90%, or 100% composite or carbon fiber.

In some embodiments, the fuselage 110 may be fabricated from three or fewer barrels. For example, in some embodiments the fuselage 110 may be fabricated from a single barrel, obviating the need to bolt multiple barrels together which can increase the time required to produce the aircraft and further reduce the structural integrity of the aircraft by introducing structural weaknesses where the barrels are adjoined.

As discussed above, the use of carbon fiber or other composite materials can result in a light weight structure that is stronger and more resilient than traditional designs. The use of composite materials can decrease the weight of the aircraft while increasing fuel economy, efficiency, or performance. In this manner, a substantially composite construction can allow for the implementation of previously untenable designs. For example, in some embodiments, a substantially all composite design can allow for the implementation of a high aspect ratio tri-wing configuration implemented in conjunction with a passenger jet, cargo jet, or other airliner.

One such embodiment includes three high aspect ratio main lifting surfaces or wings 120, 130, 140 coupled to the fuselage 110, such that the main lifting surfaces or wings 120, 130, 140 are configured to produce substantially all the required lift during flight operations. In selected embodiments, the wings 120, 130, 140 may be at least approximately identical in structure or design. In other embodiments, one or more of the wings 120, 130, 140 can differ in structure or design (e.g., include different airfoil sections, have differing spans, different aspect ratios, etc.).

The first wing 120 includes a leading edge 123 and a trailing edge 124. The first wing 120 extends from a first tip 122a of the first wing 120 to a second tip 122b of the first wing 120. The first wing 120 intersects the fuselage 110 at a first root 121a of the first wing 120 and a second root 121b of the first wing 120. In the present embodiment, a left or first portion 125 and a right or second portions 126 of the first wing 120 are cantilevered from the fuselage 110 and extend symmetrically from the wing roots 121a, 121b of the first wing 120 to the wing tips 122a, 122b of the first wing 120 respectively.

Similarly, the second wing 130 includes a leading edge 133 and a trailing edge 134. The second wing 130 extends from a first tip 132a of the second wing 130 to a second tip 132b of the second wing 130. The second wing 130 intersects the fuselage 110 at a first root 131a of the second wing 130 and a second root 131b of the second wing 130. In the present embodiment, a left or first portion 135 and right or second portions 136 of the second wing 130 are cantilevered from the fuselage 110 and extend symmetrically from the wing roots 131a, 131b of the second wing 130 to the wing tips 132a, 132b of the second wing 130 respectively.

The third wing 140 includes a leading edge 143 and a trailing edge 144. The third wing 140 extends from a first tip 142a of the third wing 140 to a second tip 142b of the third wing 140. The third wing 140 intersects the fuselage 110 at a first root 141a of the third wing 140 and a second root 141b of the third wing 140. In the present embodiment, a left or first portion 145 and right or second portions 146 of the third wing 140 are cantilevered from the fuselage 110 and extend symmetrically from the wing roots 141a, 141b of the third wing 140 to the wing tips 142a, 142b of the third wing 140 respectively.

In the present embodiment, the span of each of the three wings 120, 130, 140 measured form the first tips 122a, 132a, 142a to the second tips 122b, 132b, 142b respectively is 168 feet. The chord at each wing tip 122a, 122b, 132a, 132b, 142a, 142b is 2.0 feet, and the chord at each of the wing root 121a, 121b, 131a, 131b, 141a, 141b is 6.5 feet. In the present embodiment, the leading edge 123, 133, 143 of each wing 120, 130, 140 is rearwardly swept form the wing root 121a, 121b, 131a, 131b, 141a, 141b to the wing tip 122a, 122b, 132a, 132b, 142a, 142b and the trailing edge 124,134, 144 of each wing 120, 130, 140 is substantially straight or un-swept form the wing root 121a, 121b, 131a, 131b, 141a, 141b to the wing tip 122a, 122b, 132a, 132b, 142a, 142b. This results in a wing area of approximately 714 square feet for each wing 120, 130, 140. Accordingly, each wing 120, 130, 140 has an aspect ratio (e.g., wing $span^2$/wing area) of approximately 39.5. This aspect ratio strikes a balance between improving lift over drag performance while mitigating structural integrity concerns and still exhibiting acceptable maneuverability for a cargo liner or passenger carrying jet.

In the present embodiment, the wings 120, 130, 140 all include NACA 23014 airfoil sections at the wing roots 121a, 121b, 131a, 131b, 141a, 141b with an approximately 14% thickness to chord ratio and NASA SC(2)-0610 airfoil sections at the wing tips 122a, 122b, 132a, 132b, 142a, 142b with an approximately 10% thickness to chord ratio; chosen for a design cruise condition of Mach 0.72 at 40,000 feet. Other embodiments can include other types of airfoil sections with various thickness to chord ratios. For example, various airfoil sections can include various NACA airfoils sections, NASA airfoils sections, supercritical airfoil sections, laminar flow airfoil sections, symmetrical airfoil sections, and the like. In selected embodiments the wings 120, 130, 140 do not have the same airfoil sections or an individual wing can be comprised of the same or different types of airfoil sections over the span of the wing. For example, in some embodiments, at least one of the wings 120, 130, 140 can include an airfoil section similar to an airfoil section incorporated in a KC-135 winglet while other wings include the same or different airfoil sections.

The wings 120, 130, 140 are also comprised or constructed of a composite material such as a carbon-fiber material. In some configurations, the composite material lends additional structural strength or rigidity to the high aspect-ratio wings, for example, allowing the wings 120, 130, 140 to be cantilevered from the fuselage 110. Likewise, the multiple lifting surfaces disperse the load bearing forces across the three wings to further improve the structural performance of each individual wing. Additionally, the composite construction can allow control surfaces (e.g., spoilers, ailerons, etc.) powerful enough to overcome the roll inertia of the high aspect ratio wings to be coupled to the wings 120, 130, 140 and the wings can be strong enough to withstand the control surface deflections and higher roll rates.

In other embodiments one or more of the wings 120, 130, 140 can be constructed of other materials or partially constructed from other materials, such as other composites, aluminum, other metallic blends, or the like. In selected embodiments, one or more of the wings 120, 130, 140 can be constructed of approximately 20%, 30%, 40%, 50%, 60%, 70%, 80%, 90%, or 100% composite or carbon fiber. In some embodiments, the primary structure of one or more of the wings 120, 130, 140 is made predominately of a composite such as carbon fiber. For purposes of discussion, the primary structure of the wings 120. 130, 140 may include the structural portion of the wings 120, 130, 140 (e.g., wing boxes, wing spars, wing ribs, wing skin, etc.) but may exclude other items coupled to the wings 120, 130, 140 (e.g., ailerons, spoilers, flap, slats, other high lift devices, other control surfaces, access doors, etc.). In selected embodiments, the primary structure of one or more of the wings 120, 130, 140 comprises approximately 30%, 40%, 50%, 60%, 70%, 80%, 90%, or 100% composite or carbon fiber. In selected embodiments, carbon fiber or other composite materials can be used to construct light weight structure that is strong and resilient, thereby decreasing weight and increasing fuel economy, efficiency, or performance.

While in the present embodiment the wings 120, 130, 140 extend symmetrically outward from the fuselage 110 and each have structural portions (e.g., wing boxes) that run through the fuselage 110, in other embodiments the wings 120, 130, 140 can be attached to the fuselage 110 in a different manner (e.g., and may not have wing structure extending through the fuselage) or the wings 120, 130, 140 can include additional supporting structures (e.g., struts) as they extend outwardly from the fuselage 110.

In yet other embodiments, the aerospace vehicle 100 can have more or fewer wings (e.g., 2, 4, or 5 wings), or wings having different dimensions. For example, in other embodiments the wings 120, 130, 140 can have different dimensions and aspect ratios. For example, in selected embodiments, the wings can be sized for an aerospace vehicle 100 of another size (e.g., the size of a micro drone or an A-380). In other embodiments, the aerospace vehicle 100 can have different aspect ratios appropriate for different design considerations. For example, in some embodiments, the wings 120, 130, 140 can have aspect ratios ranging from 1 to 65, including aspect ratios of approximately 20, 25, 30, 35, 40, 45, 50, 55, 60, or 65. In selected embodiments the wings 120, 130, 140 can have different spans or aspect ratios from one another. For example, in some embodiments, one or more of the wings 120, 130, 140 can have spans or aspect ratios that are within 5%, 10%, 15%, 20%, 25%, 30%, 35%, 40% 45%, 50%, 55%, 60%, 65%, 70%, or 75% of one another.

In still other embodiments, one or more of the wings 120, 130, 140 can include winglets or raked wing tips. Additionally, other embodiments the wings 120, 130, 140 can have other planform configurations (e.g., straight un-swept, elliptical, forward swept, highly swept leading edge, highly swept trailing edges, highly swept leading and trailing edges, and the like) While in the present embodiment the wings 120, 130, 140 do not have any wing sections with anhedral or dihedral, in other embodiments one or more of the wings 120, 130, 140 can include wing sections with anhedral or dihedral.

The present embodiment the three wings 120, 130, 140 are coupled to the fuselage 110 such that the wings 120, 130, 140 are staggard both longitudinally and vertically. As discussed below, the exact configuration of the aerospace vehicle 100, including wing placement, can be varied, but disclosed herein are the ranges identified by the inventors as most workable through analysis and experimentation.

In FIGS. 1A-1D, the second wing 130 is coupled to the fuselage 110 such that the intersections of the leading edge 133 and the wing roots 131a, 131b of the second wing 130 are located approximately 75.5 feet from the longitudinal datum plane 111 and approximately 8.25 feet from the waterline datum plane 115 or above the bottom of the fuselage 110. In other terms, the second wing 130 is coupled to the fuselage 110 such that the intersections of the leading edge 133 and the wing roots 131a, 131b of the second wing 130 are located approximately 50.33% of the fuselage length or 44.94% of the wingspan or 1776.47% of the mean aerodynamic chord from the longitudinal datum plane 111. Similarly, the second wing 130 is coupled to the fuselage 110 such that the intersections of the leading edge 133 and the wing roots 131a, 131b of the second wing 130 are located approximately 5.55% of the fuselage length or 4.91% of the wingspan or 194.12% of the mean aerodynamic chord from the waterline datum plane 115.

In the present embodiment, the first wing 120 is coupled to the fuselage 110 such that the intersections of the leading edge 123 and the wing roots 121a, 121b of the first wing 120 are located approximately 44.5 feet forward of the intersections of the leading edge 133 and the wing roots 131a, 131b of the second wing 130 (e.g., 31 feet from the longitudinal datum plane 111) and approximately 6 feet lower than the intersections of the leading edge 133 and the wing roots 131a, 131b of the second wing 130 (e.g., 2.25 feet above the waterline datum plane 115 or above the bottom of the fuselage 110). In other terms, the first wing 120 is coupled to the fuselage 110 such that the intersections of the leading edge 123 and the wing roots 121a, 121b of the first wing 120 are located approximately 29.67% of the fuselage length or 26.49% of the wingspan of the second wing 130 or 1047.06% of the mean aerodynamic chord of the second wing 130 forward of the intersections of the leading edge 133 and the wing roots 131a, 131b of the second wing 130. Similarly, the first wing 120 is coupled to the fuselage 110 such that the intersections of the leading edge 123 and the wing roots 121a, 121b of the first wing 120 are located approximately 4.00% of the fuselage length or 3.57% of the wingspan of the second wing 130 or 141.18% of the mean aerodynamic chord of the second wing 130 below the intersections of the leading edge 133 and the wing roots 131a, 131b of the second wing 130.

In FIGS. 1A-1D, the third wing 140 is coupled to the fuselage 110 such that the intersections of the leading edge 143 and the wing roots 141a, 141b of the third wing 140 are located approximately 44.5 feet aft of the intersections of the leading edge 133 and the wing roots 131a, 131b of the second wing 130 (e.g., 120 feet from the longitudinal datum plane 111) and approximately 6 feet above the intersections of the leading edge 133 and the wing roots 131a, 131b of the second wing 130 (e.g., 14.25 feet above the waterline datum plane 115 or above the bottom of the fuselage 110). In other terms, the third wing 140 is coupled to the fuselage 110 such that the intersections of the leading edge 143 and the wing roots 141a, 141b of the third wing 140 are located approximately 29.67% of the fuselage length or 26.49% of the wingspan of the second wing 130 or 1047.06% of the mean aerodynamic chord of the second wing 130 aft of the intersections of the leading edge 133 and the wing roots 131a, 131b of the second wing 130. Similarly, the third wing 140 is coupled to the fuselage 110 such that the intersections of the leading edge 143 and the wing roots 141a, 141b of the third wing 120 are located approximately 4.00% of the fuselage length or 3.57% of the wingspan of the second wing 130 or 141.18% of the mean aerodynamic chord of the second wing 130 above the intersections of the leading edge 133 and the wing roots 131a, 131b of the second wing 130.

Of course, in other embodiments the wings 120, 130, 140 can be located more forward, more aft, lower, or higher on the fuselage 110. In selected embodiments, the wings 120, 130, 140 can be coupled to the fuselage via interviewing structure or attached directly to the fuselage (e.g., within the side profile of the fuselage or on the top or bottom of the fuselage). In some embodiments at least one of the wings 120, 130, 140 can include multiple portions (e.g., attached to each side of the fuselage) or can be a single continuous structure extending from one tip through the fuselage to the other tip. Additionally, the wings 120, 130, 140 can be staggard differently or spaced differently relative to one another. In still other embodiments, one or more of the wings 120, 130, 140 can be located above, below, forward, or behind the fuselage, being coupled to the fuselage by intervening structure such as one or more struts, braces, other aerodynamic surfaces, or the like. For example, in selected embodiments, the third wing 140 can be positioned above the fuselage 110 and coupled to the first stabilizer surface 151 and the second stabilizer surface 152. In yet other embodiments, at least two of the wings 120, 130, 140 can be spaced longitudinally from one another, but not staggered vertically. Similarly, in other embodiments at least two of the wings 120, 130, 140 can have the same longitudinal position, but be spaced or staggered vertically. For purposes of discussion, if a wing is located off the fuselage and is configured to be one continuous airfoil (e.g., a wing located above, and not intersecting the fuselage), the wing roots are considered to be co-located at the mid-point of the continuous airfoil.

In selected embodiments, the second wing 130 is located longitudinally between the first wing 120 and the third wing 140, and its leading edge 133 at the wing roots 131a, 131b is placed aft of the longitudinal datum plane 111 at approximately 5%, 10%, 15%, 20%, 25%, 30%, 35%, 40%, 45%, 50%, 55%, 60%, 65%, 70%, 75%, 80%, 85%, 90%, or 95% of the fuselage length (or alternately a percentage of another reference length such as the span of one of the wings 120, 130, 140). Correspondingly, the intersections of the leading edge 123 and wing roots 121a, 121b of the first wing 120 can be placed forward of the intersections of the leading edge 133 and wing roots 131a, 131b of the second wing 130 by 5%, 10%, 15%, 20%, 25%, 30%, 35%, 40%, 45%, 50%, 55%, 60%, 65%, 70%, 75%, 80%, 85%, 90%, or 95% of the fuselage length (or alternately a percentage of another reference length such as the span of one of the wings 120, 130, 140). The first wing 120 can also be placed vertical above or below the second wing 130 by any amount. For example, the intersections of the leading edge 123 and wing roots 121a, 121b of the first wing 120 can be placed above or below the intersections of the leading edge 133 and wing roots 131a, 131b of the second wing 130 by 0%, 1%, 2%, 3%, 4%, 5%, 6%, 7%, 8%, 9%, 10%, 11%, 12%, 13%, 14%, 15%, 20%, 25%, or 30% of the fuselage length (or alternately a percentage of another reference length such as the span of one of the wings 120, 130, 140).

Similarly, in the above example, the intersections of the leading edge 143 and wing roots 141a, 141b of the third wing 140 can be placed aft of the intersections of the leading edge 133 and wing roots 131a, 131b of the second wing 130 by 5%, 10%, 15%, 20%, 25%, 30%, 35%, 40%, 45%, 50%, 55%, 60%, 65%, 70%, 75%, 80%, 85%, 90%, or 95% of the fuselage length (or alternately a percentage of another reference length such as the span of one of the wings 120, 130, 140). The third wing 140 can also be placed vertically above or below the second wing 130 by any amount. For example, the intersections of the leading edge 143 and wing roots 141a, 141b of the third wing 140 can be placed above or below the intersections of the leading edge 133 and wing roots 131a, 131b of the second wing 130 by 0%, 1%, 2%, 3%, 4%, 5%, 6%, 7%, 8%, 9%, 10%, 11%, 12%, 13%, 14%, 15%, 20%, 25%, or 30% of the fuselage length (or alternately a percentage of another reference length such as the span of one of the wings 120, 130, 140). One skilled in the art will understand that any of the above described wing locations can be expressed with referenced to various aircraft parameters, such as a percentage of fuselage diameter, wing or airfoil section thickness, mean aerodynamic chord, and the like.

For example, FIGS. 2A-2B shows another embodiment of the disclosure with another wing spacing. In FIGS. 2A-2B, an aerospace vehicle 200 includes a first wing 220, a second wing 230, and a third wing 240 coupled to a fuselage 210. The fuselage 210 is 150 feet long and has a diameter of 17 feet. Each of the wings 220, 230, 240 has a wingspan of 168 feet, measured from first tips 222a, 232a, 242a to second tips 222b, 232b, 242b, respectively. The first wing 220 includes a leading edge 223, a trailing edge 224, a first wing root 221a, and a second wing root 221b. The second wing 230 includes a leading edge 233, a trailing edge 234, a first wing root 231a, and a second wing root 231b. The third wing 240 includes a leading edge 243, a trailing edge 244, a first wing root 241a, and a second wing root 241b.

In FIGS. 2A-2B a longitudinal datum plane 211 is the forward most tip of a nose 218 or nose dome of the aerospace vehicle 200 (excluding any extensions beyond the nose dome such as a pitot tube, etc.) and for purposes of defining fuselage stations the stations run longitudinally parallel to the ground as the aircraft sits on its landing gear. Stations are represented in terms of feet from the longitudinal datum plane 211 (which is station zero) with positive values progressing toward a rear 219 of the aerospace vehicle 200 and negative values progressing forward of the nose 218. Similarly, a waterline datum plane 215 runs parallel to the ground as the aerospace vehicle 200 sits on its landing gear and runs through the lowest point 217 of the fuselage 210 (excluding items extending from the fuselage such as the landing gear, antenna, etc.). Locations can be expressed in terms of feet from the waterline datum plane 215, with positive values progressing upwardly away from the waterline datum plane 215 toward the top 216 of the fuselage 210 and negative values progressing downwardly away from the waterline datum plane 215. In the present embodiment, forwardly, rearwardly, upwardly, and downwardly are defined with reference to how the aerospace vehicle 200 sits on its landing gear on the ground and the general direction the aerospace vehicle 200 travels in one g forward flight and as perceived by a pilot or operator sitting in the cockpit. One skilled in the art will understand that although the embodiments herein are discussed primarily with reference to a piloted aerospace vehicle, various embodiments are not limited to a piloted vehicle and may be implemented in unmanned aerospace vehicles. Additionally, although the nomenclature and system for describing the location or placement of items on the vehicle discussed above will be used in the discussion below, it is understood that other equivalent nomenclature and systems can be adopted without changing the underlying concepts described below.

In FIGS. 2A-2B, the second wing 230 is coupled to the fuselage 210 such that the intersections of the leading edge 233 and wing roots 231a, 231b of the second wing 230 are located approximately 70 feet from the longitudinal datum plane 211 and approximately 8.5 feet from the waterline datum plane 215. In other terms, the second wing 230 is coupled to the fuselage 210 such that the intersections of the leading edge 233 and the wing roots 231a, 231b of the second wing 230 are located approximately 46.67% of the fuselage length from the longitudinal datum plane 211. Similarly, the second wing 230 is coupled to the fuselage 210 such that the intersections of the leading edge 233 and the wing roots 231a, 231b of the second wing 230 are located approximately 5.67% of the fuselage length from the waterline datum plane 215.

In FIGS. 2A-2B, the first wing 220 is coupled to the fuselage 210 such that the intersections of the leading edge 223 and the wing roots 221a, 221b of the first wing 220 are located approximately 40 feet forward of the intersections of the leading edge 233 and the wing roots 231a, 231b of the second wing 230 and approximately 7.5 feet above the intersections of the leading edge 233 and the wing roots 231a, 231b of the second wing 230. In other terms, the first wing 220 is coupled to the fuselage 210 such that the intersections of the leading edge 223 and the wing roots 221a, 221b of the first wing 220 are located approximately 26.67% of the fuselage length forward of the intersections of the leading edge 233 and the wing roots 231a, 231b of the second wing 230. Similarly, the first wing 220 is coupled to the fuselage 210 such that the intersections of the leading edge 223 the wing roots 221a, 221b of the first wing 220 are located approximately 5.00% of the fuselage length above the intersections of the leading edge 233 and the wing roots 231a, 231b of the second wing 230.

In FIGS. 2A-2B, the third wing 240 is coupled to the fuselage 210 such that the intersections of the leading edge 243 and the wing roots 241a, 241b of the third wing 240 are located approximately 40 feet aft of the intersections of the leading edge 233 and the wing roots 231a, 231b of the second wing 230 and approximately 5.8 feet below the intersections of the leading edge 233 and the wing roots 231a, 231b of the second wing 230. In other terms, the third wing 240 is coupled to the fuselage 210 such that the intersections of the leading edge 243 and the wing roots 241a, 241b of the third wing 240 are located approximately 26.67% of the fuselage length aft of the intersections of the leading edge 233 and the wing roots 231a, 231b of the second wing 230. Similarly, the third wing 240 is coupled to the fuselage 210 such that the intersections of the leading edge 243 and the wing roots 241a, 241b of the third wing 240 are located approximately 3.87% of the fuselage length below the intersections of the leading edge 233 and the wing roots 231a, 231b of the second wing 230. In selected embodiments, the configuration shown in FIGS. 2A-2B can have better stall characteristics over other selected configurations because of the flow interaction characteristics between the wings 220, 230, 240 (e.g., in selected configurations, the flow interaction between the wings 220, 230, 240 may be reduced or eliminated at high angles of attack).

It will be understood that precise wing placement may be refined through a combination of methods, including analysis, simulation (e.g., using computational fluid dynamics), wind tunnel testing, and flight test (full size or sub-scale models), and the like. In some embodiments, it may be desirable to select wing placements or wing spans that provide flow interaction between the wings 220, 230, 240 of the aerospace vehicle 200, for example to affect flow patterns or provide energized flow over a trailing wing at selected design conditions. In other embodiments, wing placement selection may be driven by a desire to reduce flow interaction between the wings 220, 230, 240. In yet other embodiments, it may be advantageous to consider area ruling or the transonic area rule when selected wing placement. The type of operations may also influence the design. For example, in some embodiments, the aerospace vehicle 200 may be configured to have positive, neutral, or negative static stability depending on the flight control system that is used (e.g., the use of fly-by-wire flight control computers, the use of artificial intelligence, etc.) and other operational requirements (e.g., maneuverability, operating at flight envelope extremes, etc.).

Additionally, in selected embodiments the wings 220, 230, 240 may be configured with flight controls, flow control devices, high lift devices, or folding mechanisms (e.g., to ease airport or gate access). However, because of the high aspect ratio of the wings 220, 230, 240 in some embodiments, high lift devices might not be necessary to obtain desired takeoff and landing performance. Additionally, in selected embodiments, fuel can be carried in the wings 220, 230, 240, however in other embodiments the efficient design of the lightweight composite structure and high aspect ratio wings 220, 230, 240 may reduce the amount of required fuel making fuel carriage in the wings unnecessary. Reducing the need for complex high lift devices on the wings or the need for fuel carriage in the wings can simplify wing design and allow for a more focused, thin, high aspect ratio design.

Stabilizing Unit

Returning to FIGS. 1A-1D, as discussed above, the aerospace vehicle 100 also includes the stabilizer unit or stabilizing unit 150, configured as a V-tail. In the present embodiment, the stabilizing unit 150 is coupled to the fuselage 110 and includes the first stabilizer surface 151 and the second stabilizer surface 152. The first and second stabilizer surfaces 151, 152 are airfoil sections coupled to the fuselage 110 positioned to form a V-tail configuration on an upper aft portion of the fuselage. Each stabilizer surfaces 151, 152 has a leading edge and a chord line and the stabilizer surfaces 151, 152 are position such that an angle between the chord lines of the first and second stabilizer surfaces 151, 152 is approximately 110 degrees. In other embodiments, the angle between the first and second stabilizer surfaces 151, 152 can be more or less than 110 degrees.

In the present embodiment, the first and second stabilizer surfaces 151, 152 are fixed and have no control surfaces. In this embodiment, pitch, yaw, and roll control are provided by control surfaces on the wings 120, 130, 140 (e.g., elevons, spoilers, ailerons, drag rudders, and the like). In other embodiments, the stabilizing unit 150 can include one or more all movable surfaces. For example, in one embodiment, the first and second stabilizer surfaces 151, 152 are all movable surfaces and can provide at least one of yaw, pitch, and roll control. In another embodiment, the first and second stabilizer surfaces 151, 152 are comprised of fixed airfoil portions and movable control surfaces coupled to the fixed airfoil portions. The movable control surfaces can provide at least one of yaw, pitch, and roll control. In selected embodiments, a V-tail configuration can provide at least two of pitch, yaw, or roll control using two stabilizing surfaces 151, 152 versus a more conventional empennage having three surfaces (e.g., a vertical stabilizer with rudder and two horizontal stabilizers with elevators) which generally only provides pitch and yaw control. In some embodiments, having fewer stabilizer surfaces can reduce weight or drag. These effects can be especially pronounced when implemented in an aircraft having multiple lifting surfaces, such as in embodiments featuring a tri-wing configuration. Additionally, in selected embodiments the V-tail configuration can be used to provide additional roll power to overcome the roll axis moment of inertia associated with higher aspect ratio wings.

In the present embodiment, the stabilizing unit 150 is comprised substantially of a carbon fiber material. In other embodiments, the stabilizing unit 150 can be comprised of other materials (e.g., other composite materials, aluminum, titanium, etc.). In selected embodiments a stabilizing unit 150 with multiple stabilizing or stabilizer surfaces can include stabilizing surfaces made from different materials. In still other embodiments the stabilizing unit 150 can be comprised of approximately 10%, 20%, 30%, 40%, 50%, 60%, 70%, 80%, 90%, or 100% composite materials or carbon fiber. In selected embodiments, carbon fiber or other composite materials can be used to construct light weight structure that is strong and resilient, thereby decreasing weight and increasing fuel economy, efficiency, or performance.

In selected embodiments, the stabilizing unit 150 can have other configurations and or more or less surfaces. For example, in one embodiment, the stabilizing unit 150 can be comprised of three stabilizing surfaces, each coupled to an aft portion of the fuselage and positioned to form a traditional empennage comprised of two horizontal stabilizers with elevators and a vertical stabilizer with a rudder. In other embodiments, the stabilizing unit 150 can include surfaces coupled directly or indirectly to different portions of the aerospace vehicle 100. For example, in selected embodiments the aerospace vehicle 100 can include a stabilizer unit 150 that is comprised of two stabilizing or stabilizer surfaces coupled to a forward portion of the fuselage 110 configured as a canard, two additional stabilizing or stabilizer surfaces coupled to a belly portion of the fuselage 110 configured as ventral fins, another stabilizing or stabilizer surface coupled to an upper portion of the fuselage 110 configured as a dorsal fine, and two other stabilizing or stabilizer surfaces coupled to an aft portion of the fuselage 110 configured in a T-tail configuration.

As used herein, the stabilizer unit 150 can be any one or more surface(s) coupled to a portion of the aerospace vehicle 100 and intended to provide stability or control for the aerospace vehicle 100, including trim functions. In selected embodiments, the stabilizing unit 150 can also be used as an auxiliary lifting surface to provide additional lift for the aerospace vehicle 100. In various embodiments, the aerospace vehicle 100 can include stabilizing unit 150 configurations other than those discussed above, more than one stabilizing unit 150, or no stabilizing unit 150. For example, in selected embodiments, the aerospace vehicle 100 does not include a stabilizing unit 150, providing stability and control via control surfaces on the wings 120, 130, 140 (e.g., using elevons, drag rudders, ailerons, spoilers, and the like).

Propulsion System

As discussed above, the aerospace vehicle 100 in FIGS. 1A-1D also includes the propulsion system 160. In the present embodiment, the propulsion system 160 includes a first engine 161, air fed through a first inlet 163, and a second engine 162, air fed through a second inlet 164. In the present embodiment, the first and second engines 161, 162 are turbofan engines (e.g., CFM LEAP-1C high-bypass turbofan engine, Pratt & Whitney PW1100G geared turbofan engine, or the like). However, in other embodiments the aerospace vehicle 100 propulsion system 160 can include any type of aerospace engine, including turbojet engines, turboprop engines, reciprocal engines, propfan (or un-ducted fan, open rotor, or the like) engines, rocket motors, electrical motors, hydrogen burning engines or the like. In some embodiments the propulsion system 160 can include more than one type of engine coupled to the aerospace vehicle 100.

In the present embodiment, the propulsion system 160 includes engines 161, 162 at least partially mounted or embedded in the aft portion of the fuselage 110. The engines 161, 162 are positioned so that the exhaust nozzles extend rearwardly from an aft portion of the fuselage 110 or so that the exhaust is expelled rearwardly from the aft portion of the fuselage 110. In some embodiments, the aft fuselage 110 includes blisters or bulges that allow additional room for mounting or embedding the engines 161, 162 in an aft portion of the fuselage 110.

In the present embodiment, the engines are positioned in the aft portion of the fuselage 110 in vertically stacked configuration such that the engine thrust from each engine 161, 162 is substantially aligned with the longitudinal axis such that the loss of either engine does not cause a thrust asymmetry in the directional axis. This configuration can reduce drag during engine-out conditions because the engine-out condition creates little or no sideslip and does not require control inputs to counteract asymmetric thrust. Because loss of engine on takeoff is often a major consideration in engine sizing, the use of this stacked configuration may allow smaller engines to be used in some embodiments, thereby reducing weight, increasing fuel efficiency, and allowing more optimization for cruise flight.

The air inlets 163, 164 are located on the sides of an aft portion of the fuselage 110 in the present embodiment. Although the inlets 163, 164 are only shown on the left side of the aerospace vehicle 100 in FIG. 1D, the aerospace vehicle 100 includes similar intakes on the located on an aft portion of the fuselage 110, such that there is an inlet on each side of the aerospace vehicle 100 to feed each engine. In other embodiments, there can be more or fewer inlets or inlets positioned elsewhere on the aerospace vehicle 100. In selected embodiments, aft mounted inlets positioned near or on the surface of the fuselage 110 may further reduce the likelihood of bird ingestion, thereby potentially decreasing the likelihood of engine damage or loss.

In other embodiments, the propulsion system 160 can include more or less than two engines and the engines can be distributed on, or coupled to, various portions of the aerospace vehicle 100. For example, in one embodiment the aerospace vehicle 100 can include engines 161, 162 at least partially mounted or embedded within an aft portion of the fuselage 110 in a side-by-side configuration. In other embodiments, aerospace vehicle 100 includes pod mounted engines on each side of an aft portion of the fuselage 110 and another engine mounted on a strut between the first and second stabilizer surfaces 151, 152. In other embodiments, the engines can be mounted in pods below one of the wings 120, 130, 140 or at least partially embedded at the intersections of the fuselage 110 and wing roots 121a, 121b, 131a, 131b, 141a, 141b of the wings 120, 130, 140. In still other embodiments, the aerospace vehicle 100 can include a pusher propeller equipped engine mounted at least partially within or proximate to an aft portion of the fuselage 110 and a tractor propeller equipped engine in the nose of the fuselage 110. In other embodiments, the aerospace vehicle 100 can include other propulsion system 160 configurations, more than one propulsion system 160, or no propulsion system 160.

As discussed above, selected embodiments of the disclosure can include aerospace vehicles with better fuel economy, higher efficiency, and better performance than current aircraft. For example, a light weight high aspect ratio tri-wing composite vehicle having a fuselage with a relatively high fineness ratio, stabilizing units configured in a V-tail configuration, and stacked centerline thrust engines may employ smaller, lighter engines than would typically be implemented in current passenger jet or cargo airliner of the same size. The better fuel economy, efficiency, and performance can result in lower $CO_2$ emissions and lower operating costs for an airline or other aerospace operation.

EXAMPLES

The inventors performed the below calculations to evaluate the performance of an aircraft prepared in accordance with embodiments of this disclosure. Seyhun Durmus, Theoretical model proposal on direct calculation of wetted area and maximum lift-to-drag ratio, Aircraft Engineering and Aerospace Technology 93/6, 1097 (2021) and Hao Cheng & Hua Wang, Prediction of Lift Coefficient for Tandem Wing Configuration or Multiple-Lifting-Surface System Using Prandtl's Lifting-Line Theory, Hindawi International Journal of Aerospace Engineering vol. 2018, Article ID 3104902 (2018), https://doi.org/10.1155/2018/3104902 have both been used in producing the following analysis and are incorporated herein by reference in their entireties, except for any definitions, subject matter disclaimers or disavowals, and except to the extent that the incorporated material is inconsistent with the express disclosure herein, in which case the language in this disclosure controls. The below calculations display a marked improvement in performance over traditional airframes.

Example 1

The following calculations were performed to evaluate the performance of an aircraft prepared in accordance with an embodiment this disclosure exhibiting at least some of the features disclosed herein with respect to the embodiment described in FIGS. 1A-1D.

Below, Tables 1 and 2 provide suitable working weights for an aircraft prepared in accordance with the present disclosure.

TABLE 1

Aircraft Weight

| Parameter | Value | Unit | Remarks |
|---|---|---|---|
| Passenger Seats | 260 | Each | 264 |
| Passenger Weight | 200 | lb | |
| Total Passengers | 52,000 | lb | |
| Operating Empty Weight | 76,400 | lb | |
| Fuel Weight | 27,000 | lb | |
| Maximum Takeoff Weight | 155,400 | lb | |

TABLE 2

Aircraft Weight Distribution

| Item | Weight (lbs) |
|---|---|
| Fuselage | 15,000 |
| Wings | 12,000 |
| Nose Gear | 600 |
| Main Gear | 3,000 |
| Engine Nacelle | 1,500 |
| Engines (2) | 12,000 |
| Tails | 2,000 |
| Trapped Fuel | 1,000 |
| Flight Controls | 2,000 |
| Electrical System | 3,000 |
| De-Icing | 1,500 |
| $O_2$ | 200 |
| APU | 1,000 |
| Furnishings | 8,000 |
| Fuel System | 1,600 |
| Contingency | 12,000 |
| Total | 76,400 |

The inventors analyzed an aircraft having the reported weights with respect to the Breguet Range Equation, Equation 1, to determine the aircraft's performance with respect to fuel and emissions efficiency. The results are shown in Tables 3 and 4 below.

$$R = \left(\frac{L}{D}\right)\left(\frac{V}{SFC}\right)\ln\left(\frac{W_f}{W_t}\right)$$

(Breguet Range Equation)

TABLE 3

Aircraft Fuel Performance

| Parameter | Value | Unit | Remarks |
|---|---|---|---|
| Fuel Burn Weight | 24,300 | lb | 90% |
| Fuel Burn Weight | 3,621 | gal | Jet Fuel = 6.71 lbs |
| W1/W2 | 1.024 | | |
| Leap Cruise SFC | 0.52 | | |
| Velocity | 800 | ft/s | |
| L/D | 39 | | Method 2 |
| Range | 6,990.1 | mi | |
| PMPG | 501.8 | | |
| Time | 12.8 | hr | |
| Fuel Consumption | 283 | gal/hr | |

TABLE 4

$CO_2$ Emissions

| Parameter | SE Aero | Boeing 737 Max 10 | Unit |
|---|---|---|---|
| Range | 11,254.1 | 5,310 | km |
| Fuel Weight | 12,272.7 | 18,778 | kg |
| Seats | 260 | 230 | each |
| $CO_2$ | 3.16 | 3.16 | multiplier |
| $CO_2$ Emission | .0133 | .0486 | kg/seat |
| $CO_2$ Emission Comparison | 73% | | |

From the foregoing calculations, the inventors have found that an aircraft prepared in accordance with the present disclosure can be configured to burn less fuel per hour while carrying more passengers than a traditional airframe. For instance, the calculations show an aircraft prepared in accordance with the present disclosure consumes about 283 gallons of fuel per hour, which represents a significant reduction compared to traditional airframes of a similar sized aircraft which can consume around 750 gallons of fuel per hour. Likewise, an aircraft prepared in accordance with the present disclosure exhibits significant $CO_2$ emissions reductions over traditional airframes.

The inventors further analyzed an aircraft prepared in accordance with the present disclosure to identify certain flight characteristics, such as the aircraft's lift to drag ratio. The data shown in Table 5 was analyzed with respect to Equation 2 (Method 1) and with respect to Equation 3 (Method 2) to determine the aircraft's lift to drag ratio.

TABLE 5

Lift to Drag Ratio

| Parameter | Imperial Value | Units | Metric Value | Units |
|---|---|---|---|---|
| Maximum Takeoff Weight | 155,400 | lb | 7,0488.1968 | kg |
| MTOW/3 | 51,800 | lb | 23,496.0656 | kg |
| MTOW/6 | 25,900 | lb | 11,748.0328 | kg |
| Chord Root | 6.5 | ft | 1.98 | m |
| Chord Tip | 2.0 | ft | 0.61 | m |
| Thickness | 7.8 | in | 0.20 | m |
| Fuselage Diameter | 16.5 | in | | |
| Fuselage Length | 150.0 | ft | | |

TABLE 5-continued

Lift to Drag Ratio

| Parameter | Imperial Value | Units | Metric Value | Units |
|---|---|---|---|---|
| Span | 168 | ft | 51.21 | m |
| Effective Span | 168 | ft | 51.21 | m |
| ½ Wing Effective Span | 84 | ft | 25.60 | m |
| Wing Area | 714 | ft² | 66.33 | m² |
| Aspect Ratio | 40 | | 04 | |
| S_wet | | | 410 | m² |

Assumptions

| | |
|---|---|
| Cdo | 0.01643 |
| E | 0.95 |
| Ci | 0.5 |
| K_LD | 15.5 |

$$(L/D)_{Max} = \frac{1}{2}\sqrt{\frac{\pi\varepsilon AR}{C_{D0}}} = K_{LD}\sqrt{\frac{AR}{\left(\frac{Swet}{Sref}\right)}} \quad \text{Equation 2}$$

When the foregoing data was analyzed with respect to Equation 2, the inventors identified a lift to drag ratio of about 42. From this data, it can be seen that an aircraft prepared in accordance with the present disclosure exhibits a higher lift to drag ratio than traditional airframes, such as the Boeing 757.

$$(L/D)_{Max} = K_{LD}\sqrt{\frac{AR}{\left(\frac{Swet}{Sref}\right)}} \quad \text{Equation 3}$$

When the foregoing data was analyzed with respect to Equation 3, the inventors identified a lift to drag ratio of about 39. From this data, it can be seen that an aircraft prepared in accordance with the present disclosure exhibits a higher lift to drag ratio than traditional airframes, such as the Boeing 757.

The inventors further analyzed an aircraft prepared in accordance with the present disclosure through computer modeling and aeronautical simulation. Table 6 shows certain design characteristics of the aircraft and demonstrates that an aircraft prepared in accordance with the present disclosure may achieve extremely high lift to drag ratios in comparison to traditional airframes.

TABLE 6

WING VSPAero Simulation (L/D max, Cl, Cd)

| Parameter | 1st Wing | Units |
|---|---|---|
| Wing Span | 168 | ft |
| Fuselage Diameter | 16.5 | ft |
| Fuselage Diameter at Loc | 10.0 | ft |
| Effective Span | 185 | ft |
| ½ Wing Length | 79 | ft |
| Chord Root | 6.5 | ft |
| Chord Tip | 2 | ft |
| Area | 671.5 | ft² |
| Airspeed | 800 | fps |
| Altitude | 40,000 | ft |
| Air Density | 0.000587 | slug/ft³ |
| Reynolds No. | 5.55E+06 | |
| Thickness % | 8% | 10% | 12% | 14% |
| Thickness Root (in) | 6.24 | 7.8 | 9.36 | 10.92 |
| Angle of Attack (degree) | 1.5 | 1.1 | 1.3 | 0.9 |
| Max L/D | 62 | 62 | 62.2 | 62.3 |
| Cl | 0.38 | 0.35 | 0.395 | 0.35 |
| Cd | 0.0061 | 0.00565 | 0.0064 | 0.00565 |
| Lift | 47,931.1 | 44,147.1 | 49,823.2 | 44,147.1 |
| Drag | 769.4 | 712.7 | 807.3 | 712.7 |
| L/D | 62 | 62 | 62 | 62 |

The inventors further analyzed the deflection stress an aircraft prepared in accordance with the present disclosure would be able to endure. Table 7 shows the data corresponding to these calculations. As shown in Table 7, a composite airframe comprising carbon fiber can be used to prepare an airframe having strong and robust wings.

TABLE 7

Stress-Deflection

| Parameter | Value | Units | Remarks |
|---|---|---|---|
| Safety Factor | 3.5 | | |
| Load Force on ½ Wing | 90,650 | lbf | |
| Moment_max @ root | 2,538,200 | lb.ft | $M_{max} = -\dfrac{Wl}{3}$ |
| Moment_max @ root | 30,458,400 | lb.in | |

TABLE 7-continued

Stress-Deflection

| Parameter | Value | Units | Remarks |
|---|---|---|---|
| Ultimate Tensile Stress Carbon Fiber | 250,000 | psi | |
| Elastic/Young's Modulus | 33,068,604 | psi | |
| I/c | 122 | | Section Modulus (Z) $\sigma_{max} = \dfrac{cM_Z}{I_Z}$ |

The inventors performed additional computer modeling and aeronautical simulation to elucidate certain flight characteristics of an aircraft prepared in accordance with the present disclosure. Tables 8 and 9 show how different wing parameters, such as thicknesses and chord length affect load characteristics of the aircraft wing.

TABLE 8

Simulation Results

| Effective Wing Span | 165 ft − 14 ft = 151 ft For lift force of 10,500 lbf | | | | | | | |
|---|---|---|---|---|---|---|---|---|
| Chord Root (ft) | 6.5 | 6.5 | 6.5 | 6.5 | 6.5 | 6.5 | 6.5 | 6.5 |
| Thickness | 8% | 9% | 10% | 11% | 12% | 13% | 14% | 15% |
| Thickness Root (in) | 6.24 | 7.02 | 7.8 | 8.58 | 9.36 | 10.14 | 10.92 | 11.7 |
| Chord Tip (ft) | 2 | 2 | 2 | 2 | 2 | 2 | 2 | 2 |
| ½ Wing Weight | 7,595 | | 9,601 | 10,461 | 11,467 | 12,469 | | 14,326 |
| Deflection (ft) | 26.7 | | 13.2 | 10.2 | 7.7 | 6.0 | | 4 |
| Stress (psi) | 127,100 | | 79,300 | 67,070 | 55,810 | 46,840 | | 35,340 |
| Total Wing Weight (lb) | 45,572.22 | | 57,603.42 | 62,763.78 | 68,799.9 | 74,815.14 | | 85,957.44 |

TABLE 9

Simulation Results

| Effective Wing Span (1st Wing) | 168 ft − 10 ft = 158 ft For lift force of 84,000 lbf | | | |
|---|---|---|---|---|
| ½ Wing Weight (lb) | 7,948 | 10,045 | 11,999 | 13,945 |
| Deflection (ft) | 24.5 | 12.1 | 7.1 | 4.5 |
| Stress (psi) | 106,300 | 66,960 | 46,430 | 34,390 |
| Total Wing Weight (lb) | 47,688 | 60,270 | 71,994 | 83,670 |

The inventors performed additional computer modeling and aeronautical simulation to elucidate certain flight characteristics of an aircraft prepared in accordance with the present disclosure. Table 10 shows that an aircraft prepared in accordance with the present disclosure exhibiting at least some of the features disclosed herein with respect to the embodiment described in FIGS. 1A-1D exhibits a much shorter take off distance than a traditional airframe. For instance, as shown in Table 10 an aircraft prepared in accordance with the present disclosure has a combined ground distance, $S_g$, and air distance, $S_a$, of about 1,827.9 ft. This combined takeoff distance is significantly shorter than the claimed takeoff distances of traditional airframes.

TABLE 10

Take-off Distance

| Parameter | Value | Units | Remarks |
|---|---|---|---|
| Mass | 4,826.1 | lb | 32.2 is gravity |
| Engine Thrust | 66,000 | lbf | |
| Efficiency | 90% | | |
| Thrust | 59,400 | lbf | |
| Total Wing Area | 2,142.0 | ft² | 3 wings |
| Air Density | 0.00237 | slug/cuft | |
| Cl_max Take-Off | 2.4 | | |
| Sg | 1,253.9 | ft | |
| Wing Loading (W/S) | 72.5 | | |
| V_stall | 159.72 | fps | |
| N | 1.19 | | |
| R | 5,507.02565 | | |
| H_ob | 30 | ft | |
| Theta | 0.10 | | |
| Sa | 574.039666 | ft | |
| Sg + Sa | 1,827.9 | ft | |

Example 2

The below calculations/predictions shown in Table 11 were performed to evaluate the performance of an aircraft prepared in accordance with embodiments of this disclosure similar to the embodiments represented in FIG. 2A-2B. In particular, the calculations below show for similar weights, the predicted L/D for these embodiments is comparable to the L/D for the embodiments of the vehicle discussed above in example 1, and therefore should have similar performance improvements over traditional airframes (e.g., improvements in range, $CO_2$ emissions, etc.).

TABLE 11

L/D vs Weight - Equation 3

| Weight (lbs) | L/D |
|---|---|
| 100,000 | 45 |
| 125,000 | 42 |
| 150,000 | 40 |
| 175,000 | 38 |

TABLE 11-continued

L/D vs Weight - Equation 3

| Weight (lbs) | L/D |
|---|---|
| 200,000 | 36 |
| 225,000 | 34.6 |
| 250,000 | 33 |

Certain Terminology

As discussed above, various features of the above embodiments described can be combined in different combinations to meet different design and performance goals. Although the above embodiments have been discussed in the context of an airplane, it will be understood that many of the concepts and features disclose apply to other types of aerospace vehicles. As used herein, the term "aerospace vehicle" has its ordinary and customary meaning without limitation, and includes, among other things, large airplanes, small airplanes, land planes, sea planes, tilt-wing aircraft, tilt-rotor aircraft, winged rotorcraft, spacecraft, gliders, manned aircraft, unmanned aircraft, alternately manned aircraft, large drones, small drones, micro drones, and the like.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The claims are not to be limited to the non-exclusive embodiments and examples that are illustrated and described in this disclosure, or that are discussed during the prosecution of the application.

The following is claimed:

1. An aerospace vehicle comprising:
   a fuselage having a fineness ratio of equal to or greater than 8;
   a first wing, a second wing, and a third wing coupled to the fuselage, each wing having an aspect ratio of equal to or greater than 35;
   at least one stabilizing unit coupled to the fuselage; and
   at least one propulsion system;
   wherein the first wing includes a leading edge and a first wing root of the first wing;
   wherein the second wing includes a leading edge and a first wing root of the second wing;
   wherein the third wing includes a leading edge and a first wing root of the third wing;
   wherein the first wing is coupled to the fuselage such that the intersections of the first wing leading edge and the first wing root of the first wing is located approximately 26.67% of the fuselage length forward of the intersections of the second wing leading edge and the first wing root of the second wing and approximately 5.00% of the fuselage length above the intersections of the second wing leading edge and the first wing root of the second wing; and
   wherein the third wing is coupled to the fuselage such that the intersections of the third wing leading edge and the first wing root of the third wing is located approximately 26.67% of the fuselage length aft of the intersections of the second wing leading edge and the first wing root of the second wing and approximately 3.87% of the fuselage length below the intersections of the second wing leading edge and the first wing root of the second wing.

2. A fuel efficient, low emissions airplane comprising:
   a fuselage having a fineness ratio of equal to or greater than 8, the fuselage being comprised of at least 50% composite materials;
   a first wing, a second wing, and a third wing coupled to the fuselage, each wing having an aspect ratio of equal to or greater than 35, each wing having a span within 10% of one another and an aspect ratio within 10% of one another, each wing being comprised of at least 50% composite materials, the first wing being located forward of the second and the third wings, the third wing being located behind the first and second wing, the first wing being located above the second and third wings, the third wing being located below the first and second wings;
   at least one stabilizing unit coupled to the fuselage, the stabilizing unit comprising a first stabilizer surface and a second stabilizer surfaces, the first and second stabilizer surfaces configured in a V-tail configuration; and
   at least one propulsion system comprising a first turbofan engine and a second turbofan engine, the first turbofan engine at least partially mounted within an aft portion of the fuselage, the first and second turbofan engines positioned in a vertically stacked configuration such that loss of either engine causes substantially no thrust asymmetry in the directional axis.

3. The fuel efficient, low emissions airplane of claim 2, where in the fuselage being comprised of at least 50% composite materials includes the fuselage being comprised of at least 50% carbon fiber materials and wherein each wing being comprised of at least 50% composite materials includes each wing being comprised of at least 50% carbon fiber materials.

4. The fuel efficient, low emissions airplane of claim 2, wherein the stabilizing unit includes movable portion configured to provide at least partial yaw, pitch, and roll control.

5. The fuel efficient, low emissions airplane of claim 2, wherein the first, second, and third wings include at least one of winglets and raked wingtips.

\* \* \* \* \*